United States Patent
Luo

(10) Patent No.: US 8,263,506 B2
(45) Date of Patent: Sep. 11, 2012

(54) NONWOVEN LYOCELL FIBER WEBS FOR FILTRATION

(75) Inventor: Mengkui Luo, Auburn, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 630 days.

(21) Appl. No.: 12/165,268

(22) Filed: Jun. 30, 2008

(65) Prior Publication Data

US 2009/0324926 A1    Dec. 31, 2009

(51) Int. Cl.
*D04H 1/56* (2006.01)
*D04H 1/00* (2006.01)
*B32B 5/26* (2006.01)

(52) U.S. Cl. ........ 442/400; 442/327; 442/334; 442/340; 442/381

(58) Field of Classification Search .................. 442/327, 442/334, 340, 369, 400, 381; 428/311.71
See application file for complete search history.

(56) References Cited

U.S. PATENT DOCUMENTS

| 5,039,431 A * | 8/1991 | Johnson et al. ............... 264/113 |
| 6,514,613 B2 * | 2/2003 | Luo et al. ...................... 428/393 |
| 6,854,601 B2 * | 2/2005 | Patil ............................. 210/484 |
| 2007/0224419 A1 * | 9/2007 | Sumnicht et al. ............. 428/364 |

FOREIGN PATENT DOCUMENTS

| WO | WO 2007/124521 A1 | 11/2007 |
| WO | WO 2007/124522 A1 | 11/2007 |

* cited by examiner

*Primary Examiner* — Jennifer A Steele
(74) *Attorney, Agent, or Firm* — John M. Crawford

(57) ABSTRACT

Cellulose filtration products comprising nonwoven lyocell fiber webs in which the fibers have a diameter of from 3 to 12 microns, the largest pore diameter of less than about 300 microns and a mean flow pore diameter of less than about 150 microns are disclosed. Multilayer nonwoven lyocell fiber webs are also disclosed which have lower mean flow pore diameters and lower pore sizes.

19 Claims, No Drawings

NONWOVEN LYOCELL FIBER WEBS FOR FILTRATION

FIELD

This application relates to filtration products that are made from nonwoven lyocell fiber webs.

DESCRIPTION

Biodegradable, high performance filter media are needed for air and liquid filtration. Such filter media can be produced from spunlaced nonwoven lyocell fiber webs in which the fibers have a high hemicellulose content and a low mean flow pore diameter. Meltblown lyocell fibers, in nonwoven form, are suitable for this use since the fibers can be manufactured with low fiber diameters and the structures are dense.

In one aspect the present application provides a filtration product comprising one nonwoven lyocell fiber web. In another aspect there are multiple nonwoven lyocell fiber webs.

Lyocell is made by dissolving cellulose in a mixture of N-methylmorpholine-N-oxide (NMMO) and water and extruding the solution into a regenerating bath, usually water. Lyocell is a generic term for a fiber composed of cellulose precipitated from an organic solution in which no substitution of hydroxyl groups takes place and no chemical intermediates are formed. Several manufacturers presently produce lyocell fibers, principally for use in the textile industry. For example, Lenzing, Ltd. presently manufactures and sells Tencel® fiber.

Lyocell fibers are particularly suitable for use in nonwoven applications because of their characteristic soft feel, water absorbtion, microdiameter size, biodegradability and the ability of these fibers to be combined in the spinning process to form either selfbonded or spunlaced webs. Fibers made from pulp with a high hemicellulose content are particularly suited for this application because of the added interfiber bonding attributed to hemicellulose.

Currently available lyocell fibers are produced from high quality wood pulps that have been extensively processed to remove non-cellulose components, especially hemicellulose. These highly processed pulps are referred to as dissolving grade or high a (high alpha) pulps, where the term a refers to the percentage of cellulose remaining after extraction with 17.5% caustic. Alpha cellulose can be determined by TAPPI 203. Thus, a high alpha pulp contains a high percentage of cellulose, and a correspondingly low percentage of other components, especially hemicellulose. The processing required to generate a high alpha pulp significantly adds to the cost of lyocell fibers and products manufactured therefrom. Typically, the cellulose for these high alpha pulps comes from both hardwoods and softwoods; softwoods generally have longer fibers than hardwoods.

In view of the expense of producing commercial dissolving grade pulps, it is desirable to have alternatives to conventional high alpha dissolving grade pulps as a lyocell raw material.

Low alpha (e.g., high yield) pulps can be used to make lyocell fibers. Preferably, the desired low alpha pulps will have a low copper number, a low lignin content and a desirably low transition metal content but broad molecular weight distribution.

Pulps which meet these requirements have been made and are described in U.S. Pat. No. 6,797,113, U.S. Pat. No. 6,686,093 and U.S. Pat. No. 6,706,876, the assignee of the present application. While high purity pulps are also suitable for use in the present application, low cost pulps such as Peach®, available from Weyerhaeuser, Federal Way, Wash., are suitable. These pulps provide the benefit of lower cost and better bonding for nonwoven textile applications because of their high hemicellulose content. Selected Peach® pulp properties are given in Table 1.

TABLE 1

| Peach ® Pulp Properties | |
| --- | --- |
| $S_{18}$, % | 11-14 |
| % Xylan | 7.05 |
| % Mannan | 6.10 |
| α-cellulose, % | 86 |
| IV, dl/g | 3.0-4.2 |
| Cu, number | <1.0 |
| g* | |
| Mn, Fe, Cu, ppm | <10 |
| Si, ppm | <52 |
| Extractives, % | <0.05 |

*per 100 g pulp

The term hemicellulose refers to a heterogeneous group of low molecular weight carbohydrate polymers that are associated with cellulose in wood. Hemicelluloses are amorphous, branched polymers, in contrast to cellulose which is a linear polymer. The principal, simple sugars that combine to form hemicelluloses are: D-glucose, D-xylose, D-mannose, L-arabinose, D-galactose, D-glucuronic acid and D-galacturonic acid.

Hemicellulose was measured in the fiber by the method described below for sugar analysis and represents the sum of the xylan and mannan content of the fiber.

Lyocell fibers can be spun by various processes. In one embodiment the lyocell fiber is spun from cellulose dissolved in NMMO by the process. Where the term is used it will be understood that it refers to a process that is similar or analogous to the process used for the production of thermoplastic fibers, even though the cellulose is in solution and the spinning temperature is only moderately elevated. In another embodiment the fiber is spun by the centrifugal spinning process, in another embodiment the fiber is spun by the dry-jet-wet process and in yet another embodiment the fiber is spun by the spun bonding process. Fibers formed by the process can be continuous or discontinuous depending on air velocity, air pressure, air temperature, viscosity of the solution, D.P. of the cellulose and combinations thereof; in the continuous process the fibers are taken up by a reel and optionally stretched. In one embodiment for making a nonwoven lyocell fiber web the fibers are contacted with a non solvent such as water (or water NMMO mixture) by spraying, subsequently taken up on a moving foraminous support, washed and dried. The fibers formed by this method can be in a bonded nonwoven web depending on the extent of coagulation or spunlaced. Spunlacing involves impingement with a water jet. A somewhat similar process is called "spunbonding" where the fiber is extruded into a tube and stretched by an air flow through the tube caused by a vacuum at the distal end. In general, spunbonded synthetic fibers are longer than synthetic fibers which usually come in discrete shorter lengths. In the present application the fibers are continuous. Another process, termed "centrifugal spinning", differs in that the polymer is expelled from apertures in the sidewalls of a rapidly spinning drum. The fibers are stretched somewhat by air resistance as the drum rotates. However, there is not usually a strong air stream present as in meltblowing. The other technique is dry jet/wet. In this process the filaments exiting the spinneret orifices pass through an air gap before being submerged and coagulated in a liquid bath. All four processes may be used to make nonwoven fabrics of the present application.

In one embodiment the fibers are made from a pulp with greater than about three percent by weight hemicellulose. In another embodiment the fibers are made from a pulp with greater than about eight percent by weight hemicellulose. In yet another embodiment the fibers are made from a pulp with greater than about twelve percent by weight hemicellulose.

In one embodiment the cellulose fibers contain from about 4.0 to about 18% by weight hemicellulose as defined by the sum of the xylan and mannan content of the fibers. In another embodiment the fibers contains from about 5 to about 12% by weight hemicellulose and in yet another embodiment the fibers contain from about 7% to about 9% by weight hemicellulose.

The present application provides filtration products of nonwoven lyocell fiber webs that have a wide range of fiber diameters. The nonwoven webs comprise lyocell fibers of continuous length. In one embodiment the lyocell fibers in the web have a diameter of from about 3 to about 12 microns. In another embodiment the lyocell fibers in the web have a fiber diameter of from about 6 to about 9 microns.

The basis weights of the individual nonwoven lyocell fiber webs in the filtration product can range from about 10 g/m² to about 300 g/m². Other embodiments are from about 15 g/m² to about 125 g/m², from about 20 g/m² to about 75 g/m² and from about 25 g/m² to about 40 g/m². Combinations of different basis weights of the nonwoven lyocell fiber webs can be used.

The single layer nonwoven lyocell fiber webs suitable for filtration products can be made from dried or never-dried webs. In the method a never-dried web is spunlaced either from one side or from both sides and then dried. Alternatively the web can be dried, spunlaced and then dried.

Never-dried nonwoven lyocell fiber webs with two or more layers are also suitable for manufacture of filtration products of the present application. In the method for making a two layer web, a never-dried nonwoven lyocell fiber web is laid down on a support and a second never-dried nonwoven lyocell fiber web of the same dimension is laid down over the first. The combined web structure is then spunlaced either from one or both sides and then dried. Alternatively the two layered never-dried structure can be dried, spunlaced from one or both sides, and then dried.

Multilayer webs can be made by first spunlacing a single never dried layer web, then layering these single layer spunlaced webs to make up to five layers. Subsequently the complete structure can be roll pressed and dried.

Single Layer Nonwoven Meltblown Lyocell Fiber Webs

Peach® pulp, available from Weyerhaeuser Company, Federal Way, Wash. was dissolved in NMMO to prepare solutions of 8 to 10 percent by weight level of cellulose in NMMO.

Meltblown spinning was conducted using a 60 cm width Reicofil nozzle (10 holes/cm) or a Biax 12.7 cm multirow nozzle (20 holes/cm) and the conditions given in Table 1. Water was sprayed on the dope strands between the nozzle and the conveyor belt and the fibers collected on a moving conveyor belt. The deposited web was washed again by spraying water using several beams of spray nozzles. The water was collected in a tripartite tank for counter current washing. The last washing step, (third washing), used fresh softened water which was collected for the washing stage before the last one or for the second washing stage. The wash water collected from the second wash stage was used for the first stage wash. Water from the first section under the nozzle was pumped to solvent recovery. The NMMO concentration in the wash water of the first bath was approximately 2.5 to 4 percent. After the last washing the web was passed through a squeeze roll to remove water to a solid content of 6 to 35 percent and then collected on a winder. The collected web, in the wet state, was spunlaced and dried by the screen belt drier method or the screen drum method. Spunlacing was performed on Aqua Jet equipment from the Fleissner Company, Germany. The unit was equipped with one drum with three beams, each beam having 16 nozzles/cm (40 nozzles/inch) and each nozzle having a diameter of 120μ. The water pressure was 3 bar and the initial water temperature was about 20° C. which increased with running to 30° C. to 40° C. The vacuum was 0.8 bar and the unit was run at a speed of 5 m/min. Drying was conducted either on a belt drier or a screen drum drier. The hemicellulose content of the fiber in the web ranged from 8.7 percent to 10.1 percent by weight of the fiber, (xylan ranged from 4.5 to 5.3% and mannan from 4.2 to 4.8%).

Nonwoven forming and spunlacing conditions are given in Tables 1 and 2. The formed nonwoven was wound up in the wet state. Spunlacing and drying were carried out at the Saxon Textile Research Institute (STFI), Chemnitz, Germany using one to three beams and on either one or both sides. Spunlacing and drying were two different steps. After spunlacing the wet nonwoven web was wound up and then dried. Sample 9 was dried by heat pressing with an iron, all other samples were dried at 100° C.

TABLE 1

Nonwoven Meltblown Lyocell Fiber Web Forming Conditions

| Sample | Nozzle, holes/diam (μm) | Dope, conc./T. % ° C. | | Throughput, g/hole/min | Air, flow m³/h | temp ° C. | Belt speed, m/min |
|---|---|---|---|---|---|---|---|
| 1 | 600 | 400 | 7 | 112 | 0.3 | 300 | 122 | 0.7 |
| 2 | 600 | 400 | 7 | 110 | 0.6 | 350 | 118 | 0.9 |
| 3 | 600 | 400 | 7 | 113 | 0.3 | 300 | 122 | 4.20 |
| 4 | 600 | 400 | 7 | 110 | 0.4 | 350 | 120 | 1.0 |
| 5 | 600 | 400 | 7 | 111 | 0.6 | 450 | 119 | 1.4 |
| 6 | 600 | 400 | 7 | 110 | 0.25 | 250 | 121 | 0.6 |
| 7 | 600 | 400 | 7 | 110 | 0.6 | 350 | 119 | 1.4 |
| AA | 600 | 400 | 8 | 112 | 0.3 | 350 | 130 | 0.6 |
| 8 | 250 | 220 | 10 | 125 | 1.0 | 450 | 138 | 1.6 |
| 9 | 250 | 220 | 10 | 125 | 1.0 | 450 | 138 | 1.6 |

Samples 1-7 and AA were made with the Reicofil nozzle; samples 8 and 9 were made with the Biax nozzle

TABLE 2

Spunlacing And Drying Conditions For Single Layer Nonwoven Meltblown Lyocell Fiber Webs

| Sample | Spunlacing, no. of beams | Spunlacing, pressure beam 1-3 (bar) | Drying speed, m/min |
|---|---|---|---|
| 1 | 2 from one side only | —/20/20 | 2.5 |
| 2 | 3 from both sides | 10/20/50 | 1.8 |
| 3 | 1 from one side only | —/20/— | 8.5 |
| 4 | 1 from one side only | —/20/— | 4.5 |
| 5 | 1 from one side only | —/20/— | 3.5 |
| 6 | 1 from one side only | —/20/— | 4 |

TABLE 2-continued

Spunlacing And Drying Conditions For Single Layer Nonwoven Meltblown Lyocell Fiber Webs

| Sample | Spunlacing, no. of beams | Spunlacing, pressure beam 1-3 (bar) | Drying speed, m/min |
|---|---|---|---|
| 7 | 1 from one side only | —/20/— | 3.0 |
| AA | 3 from both sides | 10/20/50 | 1.8 |
| 8 | 3 from both sides | 30 30 50 | 1.0 |
| 9 | heat pressed | no | N/A |

Nonwoven lyocell fiber web properties are given in Tables 3 to 5, inclusive.

Fiber tensile strength and elongation properties of the samples were carried out based on the nonwoven test methods of EDANA 20.2-89.

In one embodiment the machine direction tensile strength is from about 200 to about 3500 N/m, in and in another embodiment it is from about 500 to about 800 N/m. In one embodiment the machine direction elongation is from about 3 to about 50%. In another embodiment the machine direction elongation is from about 5 to about 15%, in another it is from about 5 to about 10 and in yet another embodiment it is from 7 to 9%.

The bubble point and the mean pore diameter were determined using the PMI Capillary Flow Porometer using Galwick™ wetting agent with a surface tension of 15.6 dynes/cm. The wetting agent is a florinated synthetic polymer. The Porometer measures the diameter of a pore at its most constricted part, the largest pore diameter, the mean pore diameter, the pore distribution, and gas permeability in a porous material. In the method, the pores in the sample are spontaneously filled with a wetting liquid whose surface free energy with the sample is lower than the surface free energy of the sample with a non-reacting gas. Pressure of a nonreacting gas on one side of the sample is slowly increased to remove liquid from pores and permit gas flow through the pores. Measured differential pressures and flow rates of gas through wet and dry conditions of the sample are used to compute pore structure characteristics. The bubble point of the structure is the pressure at which the first stream of bubbles is emitted from the upper surface of the structure and is represented by the largest pore diameter.

In one embodiment the largest pore diameter is less than about 300 microns but greater than about 10 microns. In another embodiment the largest pore diameter is from about 20 to about 250 microns and in another embodiment the largest pore diameter is from about 90 to about 200 microns.

In one embodiment the mean flow pore diameter is less than about 150 microns but greater than about 5 microns. In another embodiment the mean flow pore diameter is less than about 110 but greater than about 25 microns and in another embodiment it is less than about 80 but greater than about 50. As defined herein, the mean flow pore diameter is the pore diameter at a pressure drop at which the flow through a wetted medium is 50 percent of the flow through the dry medium.

Gurley Stiffness was measured by TAPPI T543. Basis weight, caliper, density and bulk were measured by TAPPI T-220; air permeability was measured by TexTest FX 3300 which is based on ASTM D737.

In one embodiment the air flow permeability is from about 100 to about 7500 $l/m^2$ sec. In another embodiment the air flow permeability is from about 800 to about 3500 $l/m^2$ sec.

Fiber diameters were determined with a light optical microscope. One hundred fibers or fibers/bundles were counted for each sample to obtain the average diameter. Fiber bundles represent two or more coalesced fibers.

TABLE 3

Nonwoven Meltblown Lyocell Fiber Web Properties

| Sample | Basis weight $g/m^2$ | Tenacity MD N/m | Tenacity CD N/m | Elongation MD % | Elongation CD % |
|---|---|---|---|---|---|
| 1 | 41.9 | 710 | 400 | 7.5 | 21.8 |
| 2 | 67.7 | 470 | 160 | 6.1 | 29.3 |
| 3 | 17.5 | 220 | 50 | 10.3 | 36.9 |
| 4 | 41.9 | 370 | 140 | 7.7 | 16.2 |
| 5 | 43.7 | 560 | 270 | 6.2 | 13.7 |
| 6 | 44.1 | 780 | 400 | 9.0 | 26.0 |
| 7 | 41.2 | 450 | 140 | 4.2 | 12.2 |
| AA | 48 | 910 | 460 | 6.3 | 19.1 |
| 8 | 107 | 3410 | | 13.6 | 131.6* |

*Modulus MD, N/m

TABLE 4

Nonwoven Lyocell Fiber Web And Fiber Properties

| Sample | Xylan, % | Mannan, % | Fiber diam., μ | Fiber Bundle diam., μ | Largest Pore diam., μ | Mean Flow Pore Diam., μ |
|---|---|---|---|---|---|---|
| 1 | 4.5 | 4.2 | 3.9 | 14.5 | 111 | 46 |
| 2 | 4.6 | 4.5 | 10.2 | 30 | 158 | 81 |
| 3 | 4.9 | 4.7 | 7.7 | 21.4 | 271 | 126 |
| 4 | 4.6 | 4.5 | 9.8 | 28.7 | 236 | 67 |
| 5 | 5 | 4.6 | 7.8 | 26.3 | | |
| 6 | 5.1 | 4.8 | 7.2 | 19.8 | 98 | 28 |
| 7 | 5.3 | 4.7 | 9.7 | 34.8 | 189 | 110 |
| 8 | 4.9 | 4.7 | 7.5 | 11.2 | 32 | 9 |
| 9 | 4.9 | 4.7 | 7.5 | 11.2 | 43 | 12 |
| Viledon ® (PP) | | | | | 16 | 7 |
| Viledon ® (PET) | | | | | 18 | 11 |

Viledon ® is a polypropylene (PP) and Viledon ® is a polyester (PET) filter media. Both are available from Freudenberg Nonwovens, Hopkinsville, KY

TABLE 5

Nonwoven Meltblown Lyocell Fiber Web Properties

| Sample | Basis Wt., g/m² | Caliper, mm | Density, kg/m³ | Bulk, cm³ | Gurley Stiffness, MD, mg | Air Permeability, l/m² sec | MD Tensile, N/m | MD Elongation, % |
|---|---|---|---|---|---|---|---|---|
| 1 | 41.9 | 0.206 | 203.9 | 4.905 | 13.9 | 1744.5 | 710 | 7.5 |
| 2 | 67.7 | 0.379 | 178.4 | 5.608 | 25.1 | 3416.5 | 470 | 6.1 |
| 3 | 17.5 | 0.114 | 152.8 | 6.549 | 1.1 | 7360.9 | 220 | 10.3 |
| 4 | 41.9 | 0.172 | 241.8 | 4.139 | 5.7 | 3327.1 | 370 | 7.7 |
| 5 | 43.7 | 0.246 | 177.5 | 5.639 | 18.4 | 3627.1 | 560 | 6.2 |
| 6 | 44.1 | 0.159 | 278.1 | 3.596 | 17.1 | 807.7 | 780 | 9.0 |
| 7 | 41.2 | 0.243 | 169.9 | 5.895 | 15.1 | 4249.7 | 450 | 4.2 |
| 8 | 107 | 0.290 | 369.0 | 2.71 | 38.6 | 185.2 | 3410 | 14 |
| 9 | 107 | 0.320 | 334.4 | 2.99 | 62.9 | 239.7 | | |
| Viledon ® (PP) | 100 | 0.3 | | | | 45 | 1900 | 15.0 |
| Viledon ® (PET) | 60 | 0.24 | | | | 100 | 1380 | 18.0 |

Multiple Layer Webs

Never dried nonwoven lyocell fiber webs, AA, were made as previously described, squeeze rolled to 6 to 35 percent solids and spunlaced as described for the single layer samples. The samples were spunlaced either on one or both sides using 1 to 3 pressure beams. These webs, of the same dimension and up to five layers were laid over the first web and roll pressed for 5 seconds at 70 psig. The samples were drum dried under restraint between belts in a drum dryer at 105° C. for 5 minutes. Web properties are listed in Table 6. Sample A was from sample AA with air drying under tension on all sides. Sample B was from sample AA with ironing only for drying. Sample 12 was made like 15, except there was no pressing.

In one embodiment the mean flow pore diameter is less than about 30 but greater than about 5 microns. In another embodiment the mean flow pore diameter is less than about 20 but greater than about 10 microns.

In one embodiment the largest pore diameter (diam.) is less than about 70 microns but greater than about 20 microns. In another embodiment the largest pore diameter is less than 50 but greater than 30 microns.

Fibers in these multiple layer webs are for about 3 to about 12 microns in diameter.

Sugar Analysis

This method is applicable for the preparation and analysis of pulp and wood samples for the determination of the amounts of the following pulp sugars: fucose, arabinose, galactose, rhamnose, glucose, xylose and mannose using high performance anion exchange chromatography and pulsed amperometric detection (HPAEC/PAD).
Summary of Method
Polymers of pulp sugars are converted to monomers by hydrolysis using sulfuric acid.
Samples are ground, weighed, hydrolyzed, diluted to 200-mL final volume, filtered, diluted again (1.0 mL+8.0 mL $H_2O$) in preparation for analysis by HPAEC/PAD.
Sampling, Sample Handling and Preservation
Wet samples are air-dried or oven-dried at 25±5° C.
Equipment Required
Autoclave, Market Forge, Model # STM-E, Serial # C-1808
100×10 mL Polyvials, septa, caps, Dionex Cat #55058
Gyrotory Water-Bath Shaker, Model G76 or some equivalent.
Balance capable of weighing to ±0.01 mg, such as Mettler HL52 Analytical Balance.
Intermediate Thomas-Wiley Laboratory Mill, 40 mesh screen.
NAC 1506 vacuum oven or equivalent.

TABLE 6

Nonwoven Meltblown Lyocell Fiber Web Properties of Multiple Layer Webs

| Sample | Layers | Treatment | Largest Pore diam., μ | MFPD, μ | Basis Wt., g/m² | Caliper, mm | Density, kg/m³ | Bulk, cm³ |
|---|---|---|---|---|---|---|---|---|
| A | 1 | ad/t | 59 | 24 | 40 | 0.189 | 211.6 | 4.73 |
| B | 1 | i | 90 | 41 | 40 | 0.189 | 211.6 | 4.73 |
| 10 | 1 | p/dd | 73 | 23 | 40 | 0.218 | 183.5 | 5.45 |
| 11 | 2 | p/dd | 57 | 16 | 80 | 0.335 | 238.8 | 4.19 |
| 12 | 2 | np/dd | 67 | 23 | 80 | 0.298 | 268.46 | 3.73 |
| 13 | 3 | p/dd | 46 | 12 | 120 | 0.495 | 242.4 | 4.13 |
| 14 | 4 | p/dd | 32 | 11 | 160 | 0.840 | 190.5 | 5.25 |
| 15 | 5 | p/dd | 35 | 9 | 200 | 0.889 | 224.97 | 4.45 |

Note:
"ad/t" is air dried under tension;
"i" is ironing;
"p/d" is pressed and drum dried;
"n/p" is not pressed and drum dried
MFPD is mean flow pore diameter 0.45-μ GHP filters, Gelman type A/E, (4.7-cm glass fiber filter discs, without organic binder)

Heavy-walled test tubes with pouring lip, 2.5×20 cm.

Comply SteriGage Steam Chemical Integrator

GP 50 Dionex metal-free gradient pump with four solvent inlets

Dionex ED 40 pulsed amperometric detector with gold working electrode and solid state reference electrode Dionex autosampler AS 50 with a thermal compartment containing the columns, the ED 40 cell and the injector loop Dionex PC10 Pneumatic Solvent Addition apparatus with 1-L plastic bottle 3 2-L Dionex polyethylene solvent bottles with solvent outlet and helium gas inlet caps CarboPac PA1 (Dionex P/N 035391) ion-exchange column, 4 mm×250 mm CarboPac PA1 guard column (Dionex P/N 043096), 4 mm×50 mm Millipore solvent filtration apparatus with Type HA 0.45u filters or equivalent Reagents Required All references to $H_2O$ is Millipore $H_2O$ 72% Sulfuric Acid Solution (H2SO4)—Transfer 183 mL of water into a 2-L Erlenmeyer flask.

Pack the flask in ice in a Rubbermaid tub in a hood and allow the flask to cool. Slowly and cautiously pour, with swirling, 470 mL of 96.6% $H_2SO_4$ into the flask. Allow solution to cool.

Carefully transfer into the bottle holding 5-mL dispenser. Set dispenser for 1 mL.

JT Baker 50% sodium hydroxide solution, Cat. No. Baker 3727-01, [1310-73-2]

Dionex sodium acetate, anhydrous (82.0±0.5 grams/1 L $H_2O$), Cat. No.59326, [127-09-3].

Standards

Internal Standards

Fucose is used for the kraft and dissolving pulp samples. 2-Deoxy-D-glucose is used for the wood pulp samples.

Fucose, internal standard. 12.00±0.005 g of Fucose, Sigma Cat. No. F 2252, [2438-80-4], is dissolved in 200.0 mL $H_2O$ giving a concentration of 60.00±0.005 mg/mL. This standard is stored in the refrigerator.

2-Deoxy-D-glucose, internal standard. 12.00±0.005 g of 2-Deoxy-D-glucose, Fluka Cat. No. 32948 g [101-77-9] is dissolved in 200.0 mL $H_2O$ giving a concentration of 60.00±0.005 mg/mL. This standard is stored in the refrigerator.

Kraft Pulp Stock Standard Solution

| KRAFT PULP SUGAR STANDARD CONCENTRATIONS | | | |
|---|---|---|---|
| Sugar | Manufacturer | Purity | g/200 mL |
| Arabinose | Sigma | 99% | 0.070 |
| Galactose | Sigma | 99% | 0.060 |
| Glucose | Sigma | 99% | 4.800 |
| Xylose | Sigma | 99% | 0.640 |
| Mannose | Sigma | 99% | 0.560 |

Kraft Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

| PULP SUGAR STANDARD CONCENTRATIONS FOR KRAFT PULPS | | | | | | |
|---|---|---|---|---|---|---|
| | | mL/200 mL | mL/200 mL | mL/200 mL Fucose | mL/200 mL | mL/200 mL |
| Sugar | mg/mL | 0.70 ug/mL | 1.40 ug/mL | 2.10 ug/mL | 2.80 ug/mL | 3.50 ug/mL |
| Fucose | 60.00 | 300.00 | 300.00 | 300.00 | 300.00 | 300.00 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Glucose | 24.0 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Dissolving Pulp Stock Standard Solution

| DISSOLVING PULP SUGAR STANDARD CONCENTRATIONS | | | |
|---|---|---|---|
| Sugar | Manufacturer | Purity | g/100 mL |
| Glucose | Sigma | 99% | 6.40 |
| Xylose | Sigma | 99% | 0.120 |
| Mannose | Sigma | 99% | 0.080 |

Dissolving Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

PULP SUGAR STANDARD CONCENTRATIONS FOR DISSOLVING PULPS

| Sugar | mg/mL | mL/200 mL 0.70 ug/mL | mL/200 mL 1.40 ug/mL | mL/200 mL Fucose 2.10 ug/mL | mL/200 mL 2.80 ug/mL | mL/200 mL 3.50 ug/mL |
|---|---|---|---|---|---|---|
| Fucose | 60.00 | 300.00 | 300.00 | 300.00 | 300.00 | 300.00 |
| Glucose | 64.64 | 226.24 | 452.48 | 678.72 | 904.96 | 1131.20 |
| Xylose | 1.266 | 4.43 | 8.86 | 13.29 | 17.72 | 22.16 |
| Mannose | 0.8070 | 2.82 | 5.65 | 8.47 | 11.30 | 14.12 |

Wood Pulp Stock Standard Solution

WOOD PULP SUGAR STANDARD CONCENTRATIONS

| Sugar | Manufacturer | Purity | g/200 mL |
|---|---|---|---|
| Fucose | Sigma | 99% | 12.00 |
| Rhamnose | Sigma | 99% | 0.0701 |

Dispense 1 mL of the fucose solution into a 200-mL flask and bring to final volume. Final concentration will be 0.3 mg/mL.

Wood Pulp Working Solution

Use the Kraft Pulp Stock solution and the fucose and rhamnose stock solutions. Make working standards as in the following table.

PULP SUGAR STANDARD CONCENTRATIONS FOR KRAFT PULPS

| 2-Deoxy-D-glucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
|---|---|---|---|---|---|---|
| 2-DG | 60.00 | 300.00 | 300.00 | 300.00 | 300.00 | 300.00 |
| Fucose | 0.300 | 1.05 | 2.10 | 3.15 | 4.20 | 6.50 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Rhamnose | 0.3500 | 1.225 | 2.450 | 3.675 | 4.900 | 6.125 |
| Glucose | 24.00 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Procedure

Sample Preparation

Grind 0.2±05 g sample with Wiley Milt 40 Mesh screen size. Transfer ~200 mg of sample into 40-mL Teflon container and cap. Dry overnight in the vacuum oven at 50° C.

Add 1.0 mL 72% $H_2SO_4$ to test tube with the Brinkman dispenser. Stir and crush with the rounded end of a glass or Teflon stirring rod for one minute. Turn on heat for Gyrotory Water-Bath Shaker. The settings are as follows:

Heat: High
Control Thermostat: 7° C.
Safety thermostat: 25° C.
Speed: Off
Shaker: Off Place the test tube rack in gyrotory water-bath shaker. Stir each sample 3 times, once between 20-40 min, again between 40-60 min, and again between 60-80 min. Remove the sample after 90 min. Dispense 1.00 mL of internal standard (Fucose) into Kraft samples.

Tightly cover samples and standard flasks with aluminum foil to be sure that the foil does not come off in the autoclave.

Place a Comply SteriGage Steam Chemical Integrator on the rack in the autoclave. Autoclave for 60 minutes at a pressure of 14-16 psi (95-105 kPa) and temperature>260° F. (127° C.).

Remove the samples from the autoclave. Cool the samples. Transfer samples to the 200-mL volumetric flasks. Add 2-deoxy-D-glucose to wood samples. Bring the flask to final volume with water.

For Kraft and Dissolving pulp samples:

Filter an aliquot of the sample through GHP 0.45µ filter into a 16-mL amber vial.

For Wood pulp samples:

Allow particulates to settle. Draw off approximately 10 mL of sample from the top, trying not to disturb particles and filter the aliquot of the sample through GHP 0.45µ filter into a 16-mL amber vial. Transfer the label from the volumetric flask to the vial. Add 1.00 mL aliquot of the filtered sample with to 8.0 mL of water in the Dionex vial.

Samples are run on the Dionex AS/500 system. See Chromatography procedure below.

Chromatography Procedure

Solvent preparation

Solvent A is distilled and deionized water (18 meg-ohm), sparged with helium while stirring for a minimum of 20 minutes, before installing under a blanket of helium, which is to be maintained regardless of whether the system is on or off.

Solvent B is 400 mM NaOH. Fill Solvent B bottle to mark with water and sparge with helium while stirring for 20 minutes. Add appropriate amount of 50% NaOH.

(50.0 g NaOH/100 g solution)*(1 mol NaOH/40.0 g NaOH)*(1.53 g solution/1 mL solution)*(1000 mL solution/1 L solution)=19.1 M NaOH in the container of 50/50 w/w NaOH.

0.400 M NaOH*(1000 mL $H_2O$/19.1 M NaOH)=20.8 mL NaOH

Round 20.8 mL down for convenience:

$$19.1 \text{ M} * (20.0 \text{ mL} \times \text{mL}) = 0.400 \text{ M NaOH} \times \text{mL} = 956 \text{ mL}$$

Solvent D is 200 mM sodium acetate. Using 18 meg-ohm water, add approximately 450 mL deionized water to the Dionex sodium acetate container. Replace the top and shake until the contents are completely dissolved. Transfer the sodium acetate solution to a 1-L volumetric flask. Rinse the 500-mL sodium acetate container with approximately 100 mL water, transferring the rinse water into the volumetric flask. Repeat rinse twice. After the rinse, fill the contents of the volumetric flask to the 1-L mark with water. Thoroughly mix the eluent solution. Measure 360±10 mL into a 2-L graduated cylinder. Bring to 1800±10 mL. Filter this into a 2000-mL sidearm flask using the Millipore filtration apparatus with a 0.45 pm, Type HA membrane. Add this to the solvent D bottle and sparge with helium while stirring for 20 minutes.

The post column addition solvent is 300 mM NaOH. This is added postcolumn to enable the detection of sugars as anions at pH>12.3. Transfer 15±0.5 mL of 50% NaOH to a graduated cylinder and bring to 960±10 mL in water.

$$(50.0 \text{ g NaOH}/100 \text{ g Solution}) * (1 \text{ mol NaOH}/40.0 \text{ g NaOH}) * (1.53 \text{ g Solution}/1 \text{ mL Solution})(1000 \text{ mL Solution}/1 \text{ L solution}) = 19.1 \text{ M NaOH in the container of } 50/50 \text{ w/w NaOH}.$$

$$0.300 \text{ M NaOH} * (1000 \text{ ml H2O}/19.1 \text{ M NaOH}) = 15.7 \text{ mL NaOH}$$

Round 15.7 mL down:

$$19.1\text{M} * (15.0 \text{ mL}/\times \text{mL}) = 0.300 \text{ M NaOH} \times \text{mL} = 956 \text{ mL}$$

(Round 956 mL to 960 mL. As the pH value in the area of 0.300 M NaOH is steady, an exact 956 mL of water is not necessary.)

Set up the AS 50 schedule.

Injection volume is 5 uL for all samples, injection type is "Full", cut volume is 10 uL, syringe speed is 3, all samples and standards are of Sample Type "Sample". Weight and Int. Std. values are all set equal to 1.

Run the five standards at the beginning of the run.

After the last sample is run, run the mid-level standard again as a continuing calibration verification Run the control sample at any sample spot between the beginning and ending standard runs.

Run the samples.

Calculations

Calculations for Weight Percent of the Pulp Sugars $$\text{Normalized area for sugar} = \frac{(\text{Area sugar}) * (\mu g/mL \text{ fucose})}{(\text{Area Fucose})}$$

$$IS \text{ Corrected sugar amount } (\mu g/mL) = \frac{((\text{Normalized area for sugar}) - (\text{intercept}))}{(\text{slope})}$$

$$\text{Monomer Sugar Weight } \% = \frac{IS - \text{Corrected sugar } amt \ (\mu g/mL)}{\text{Sample wt. (mg)}} * 20$$

Example for arabinose:

$$\text{Monomer Sugar Weight } \% = \frac{0.15 \ \mu g/mL \text{ arabinose}}{70.71 \text{ mg arabinose}} * 20$$
$$= 0.043\%$$

Polymer Weight % = (Weight % of Sample sugar) * (0.88)

Example for arabinan:

Polymer Sugar Weight %=(0.043 wt %)*(0.88)=0.038 Weight

Note: Xylose and arabinose amounts are corrected by 88% and fucose, galactose, rhamnose, glucose, and mannose are corrected by 90%.

The results are reported as percent sugars on an oven-dried basis.

What is claimed is:

1. A cellulosic filtration product comprising:
a nonwoven lyocell fiber web further comprising:
fibers having a diameter of from about 3 to about 12 microns;
fiber bundles having a diameter from 11.2 to 34.8 microns, wherein said web has a largest pore diameter less than about 300 microns; and
a mean flow pore diameter of less than about 150 microns but greater than about 5 microns, and wherein
the air permeability is from about 100 to about 7500 l/m² sec.

2. The product of claim 1 wherein the fibers are lyocell fibers.

3. The product of claim 1 wherein the hemicellulose content of said fibers ranges from about 4 to about 18 percent by weight.

4. The product of claim 3 wherein the hemicellulose content of said fibers is from about 5 to about 12 percent by weight.

5. The product of claim 3 wherein the hemicellulose content of said fibers is from about 7 to about 9 percent by weight.

6. The product of claim 1 wherein the basis weight is from about 10 gsm to about 300 gsm.

7. The product of claim 1 wherein said fiber diameter is from about 6 to about 9 microns.

8. The product of claim 1 wherein the largest pore diameter is from about 20 to about 250 microns.

9. The product of claim 1 wherein the largest pore diameter is from about 90 to about 200 microns.

10. The product of claim 1 wherein the mean flow pore diameter is less than about 80 microns but greater than about 50.

11. The product of claim 1 wherein the air permeability is from about 800 to about 3500 l/m²sec.

12. The product of claim 1 wherein the machine direction tensile strength is from about 200 to about 3500 N/m.

13. The product of claim 1 wherein the machine direction elongation is from about 3 to about 50 percent.

14. The product of claim 1 wherein the machine direction elongation is from about 3 to about 15 percent.

15. The product of claim 1 comprising two or more nonwoven lyocell fiber webs.

16. The product of claim 15 wherein the mean flow pore diameter is less than about 30 microns but greater than about 5 microns.

17. The product of claim 15 wherein the largest pore diameter is less than about 70 microns but greater than about 20 microns.

18. The product of claim 15 wherein the fibers have a diameter of from about 3 to about 12 microns.

19. The product of claim 1 wherein the web has a density of from 152.8 to 369 kg/m$^3$.

* * * * *